(12) United States Patent
Jasinski, Jr.

(10) Patent No.: US 12,243,316 B2
(45) Date of Patent: Mar. 4, 2025

(54) METHOD AND SYSTEM OF PRESCREENING OBJECTS FOR PERMISSION BASED ACTIVITIES

(71) Applicant: The Government of the United States of America, as represented by the Secretary of Homeland Security, Washington, DC (US)

(72) Inventor: John F. Jasinski, Jr., Hammonton, NJ (US)

(73) Assignee: The Government of the United States of America, as represented by the Secretary of Homeland Security, Washington, DC (US)

(*) Notice: Subject to any disclaimer, the term of this patent is extended or adjusted under 35 U.S.C. 154(b) by 0 days.

(21) Appl. No.: 18/609,209

(22) Filed: Mar. 19, 2024

(65) Prior Publication Data

US 2024/0320979 A1    Sep. 26, 2024

Related U.S. Application Data

(60) Provisional application No. 63/453,576, filed on Mar. 21, 2023.

(51) Int. Cl.
*G06V 20/52* (2022.01)

(52) U.S. Cl.
CPC .......... *G06V 20/52* (2022.01); *G06V 2201/07* (2022.01)

(58) Field of Classification Search
CPC .. G06V 20/52; G06V 2201/07; G06V 10/764; G06V 40/172; G06V 20/64; G06V 2201/05; G06V 20/60; H04N 7/181; H04N 7/18; H04N 23/61
See application file for complete search history.

(56) References Cited

U.S. PATENT DOCUMENTS

| | | | |
|---|---|---|---|
| 9,505,554 B1* | 11/2016 | Kong | G06V 10/25 |
| 10,268,983 B2* | 4/2019 | Kumar | G07G 1/0036 |
| 11,017,240 B2* | 5/2021 | Shekhar | G08B 13/19671 |
| 11,481,751 B1* | 10/2022 | Chaubard | G06V 10/82 |
| 11,544,921 B1* | 1/2023 | Anvaripour | G06T 11/00 |
| 12,021,828 B2* | 6/2024 | Buck | H04L 63/0407 |
| 2012/0062596 A1* | 3/2012 | Bedi | G06Q 30/0267 |
| | | | 345/633 |
| 2015/0095189 A1* | 4/2015 | Dharssi | G06V 10/56 |
| | | | 705/26.8 |
| 2017/0193577 A1* | 7/2017 | Godsey | G06Q 20/405 |
| 2019/0075349 A1* | 3/2019 | Tumanov | H04N 21/25891 |
| 2019/0172039 A1* | 6/2019 | Kambara | G06Q 20/208 |
| 2020/0234055 A1* | 7/2020 | Liu | G06V 40/103 |
| 2021/0191398 A1* | 6/2021 | Chen | G05D 1/0022 |

(Continued)

*Primary Examiner* — Jared Walker

(74) *Attorney, Agent, or Firm* — Lavanya Ratnam; Robert W. Busby; Kelly G. Hyndman

(57) ABSTRACT

In an example, a prescreening method includes: capturing an image of one or more items for a user; processing the image of the one or more items by image recognition; analyzing the image processed by image recognition to determine whether any of the one or more items are listed on a list; if none of the one or more items in the image is listed on the list, informing the user that none of the one or more items in the image is listed on the list; and if any of the one or more items in the image is listed on the list, identifying each item in the image which is listed on the list to the user.

26 Claims, 13 Drawing Sheets

(56) References Cited

U.S. PATENT DOCUMENTS

| | | | |
|---|---|---|---|
| 2021/0312582 A1* | 10/2021 | Trelin | G06F 21/32 |
| 2021/0342588 A1* | 11/2021 | Davis | G06V 20/10 |
| 2021/0407131 A1* | 12/2021 | Kallakuri | G06V 20/52 |
| 2021/0407262 A1* | 12/2021 | Farneman | G08B 25/10 |
| 2022/0019841 A1* | 1/2022 | Hosono | G06V 20/52 |
| 2022/0076015 A1* | 3/2022 | Lee | G06F 18/214 |
| 2022/0198550 A1* | 6/2022 | Meidar | G06Q 20/20 |

\* cited by examiner

METHOD AND SYSTEM OF PRESCREENING OBJECTS FOR PERMISSION BASED ACTIVITIES

CROSS-REFERENCE TO RELATED APPLICATIONS

The application claims the benefit of priority from U.S. Provisional Patent Application No. 63/453,576, filed Mar. 21, 2023, entitled METHOD AND SYSTEM OF PRESCREENING OBJECTS FOR PERMISSION BASED ACTIVITIES, the disclosure of which is incorporated by reference in its entirety.

SUMMARY STATEMENT OF GOVERNMENT INTEREST

The present invention was made with support from the United States Department of Homeland Security (DHS) and by an employee of DHS in the performance of their official duties. The U.S. Government has certain rights in this invention.

FIELD

The discussion below relates generally to prescreening objects and, more particularly, to methods and systems for prescreening objects for permission-based activities.

BACKGROUND

TSA's mission is to "Protect the nation's transportation systems to ensure freedom of movement for people and commerce." Currently, to achieve this, TSA, in part, publishes an on-line list of prohibited items (due to their danger to life and infrastructure), relies on air passengers to understand this list and conscientiously pack their luggage at home, and then enforces compliance by electronically screening their bags at airport checkpoints prior to departure. The problem is that inconsistent, casual and/or careless packing—of prohibited items, benign items that falsely alarm and even heavy clutter—introduces screening demand that can exceed capacity which prevents passengers from getting to their departure gates on time. Capacity is limited because on-screen and manual methods to resolve electronic screening alarms are labor intensive.

SUMMARY

Embodiments of the present invention are directed to prescreening items for a user for the purpose of travel, shipping, checklists, etc.

In some instances, for example, the general public does not know what is allowed through a check point security, such as an airport security. One novel solution is a mobile application which can assess information, such as a photograph of a person's luggage and determine which items are not allowed (compared to the TSA list). The TSA APSS inspection of carryon bag contents—Prohibited Items Checklist may be found in https://www.tsa.gov/travel/security-screening/whatcanibring/all and https://www.tsa.gov/videos/travel-tips-prohibited-items.

One aspect of the invention is directed to a way to shape this stream-of-commerce (personal items in luggage) by making the packing process easier for the air passenger to comply with the prohibited list. An air passenger may lay out all the non-clothing items to be packed for travel on a surface such as the floor or bed, use a smartphone camera to take a photograph or a video, and upload the image (still or moving). The mobile application may be launched to analyze and place red and green boxes around the items to indicate likely allowable and prohibited items, respectively. It may also indicate items which may represent risks to speedy transit through the security checkpoint.

In one example, a virtual concierge app, such as used on a mobile device, for example, is used to advise an air passenger traveling on a commercial airline on TSA permissible personal articles for packing using a smartphone camera as an at-home pre-screener. An application performing this automated, pre-screening function would create a happier passenger community as fewer items would need to be confiscated, lead to increased and consistent checkpoint throughput with consequently less passenger delay, and introduce a greater positive, social presence for TSA.

The virtual concierge app is programmed to analyze an image such as a still image of a photograph or a moving image of a video taken by a smartphone against a list of known prohibited items and match/detect those items in the photograph. It informs air travelers and automates key portions of the packing decision process. The mobile app is capable of analyzing a photograph and identifying common items which are deemed prohibited. The mobile application may be programmed to label these prohibited items based on a 2D or 3D image. In addition, the virtual concierge app may be programmed to analyze a video taken by the smartphone.

Prescreening for prohibited items is not limited to travel scenarios. Prescreening can be applied to other travel carriers such as trains, parcel shipping service, personal items to bring into a venue, and training items checklist.

In accordance with an aspect, a prescreening method comprises: capturing an image of one or more items for a user using an image capture device; processing the image of the one or more items by image recognition; analyzing the image processed by image recognition to determine whether any of the one or more items are listed on a list; if none of the one or more items in the image is listed on the list, informing the user that none of the one or more items in the image is listed on the list; and if any of the one or more items in the image is listed on the list, identifying each item in the image which is listed on the list to the user.

In specific embodiments, the list may include one of (i) a list of prohibited carryon items for travel on a commercial airline, (ii) a list of prohibited items for entry into a venue, or (iii) a list of prohibited items for shipping service. The method may include receiving travel carrier information from the user. The list may include a list of prohibited items for travel on a travel carrier identified in the travel carrier information. The method may further comprise receiving category information of the one or more items for the user. The list may include different items for different categories. The method may include analyzing the image processed by image recognition to determine whether any of the one or more items are listed on the list based on the category information.

In accordance with another aspect, a prescreening method comprises: capturing an image of one or more items for a user using an image capture device; processing the image of the one or more items by image recognition; analyzing the image processed by image recognition to determine whether any of the one or more items are listed on a list, one or more items in the image being listed on the list as one or more flagged items; prompting the user to take action with regard to the one or more flagged items, the action for the one or more flagged items including at least one of (i) taking one or more additional still photographs of the one or more items from different angles or different distances or both as one or more additional images for additional image processing, (ii) taking a video of the one or more items by moving the image capture device around from different angles or different distances or both as one or more additional images for additional image processing, or (iii) moving the one or more flagged items to different positions and capturing one or more additional images for additional image processing; and, in response to the action taken by the user, performing the additional image processing of the one or more additional images by image recognition.

Another aspect is directed to a non-transitory computer-readable recording medium storing a program including instructions that cause a processor to execute a prescreening operation, comprising: capturing an image of one or more items for a user using an image capture device; processing the image of the one or more items by image recognition; analyzing the image processed by image recognition to determine whether any of the one or more items are listed on a list; if none of the one or more items in the image is listed on the list, informing the user that none of the one or more items in the image is listed on the list; and if any of the one or more items in the image is listed on the list, identifying each item in the image which is listed on the list to the user.

Other features and aspects of various examples and embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The attached drawings help explain the embodiments described below.

DETAILED DESCRIPTION

A number of examples or embodiments of the present invention are described, and it should be appreciated that the present invention provides many applicable inventive concepts that can be embodied in a variety of ways. The embodiments discussed herein are merely illustrative of ways to make and use the invention and are not intended to limit the scope of the invention. Rather, as will be appreciated by one of skill in the art, the teachings and disclosures herein can be combined or rearranged with other portions of this disclosure along with the knowledge of one of ordinary skill in the art.

Prescreening

Figure 1:
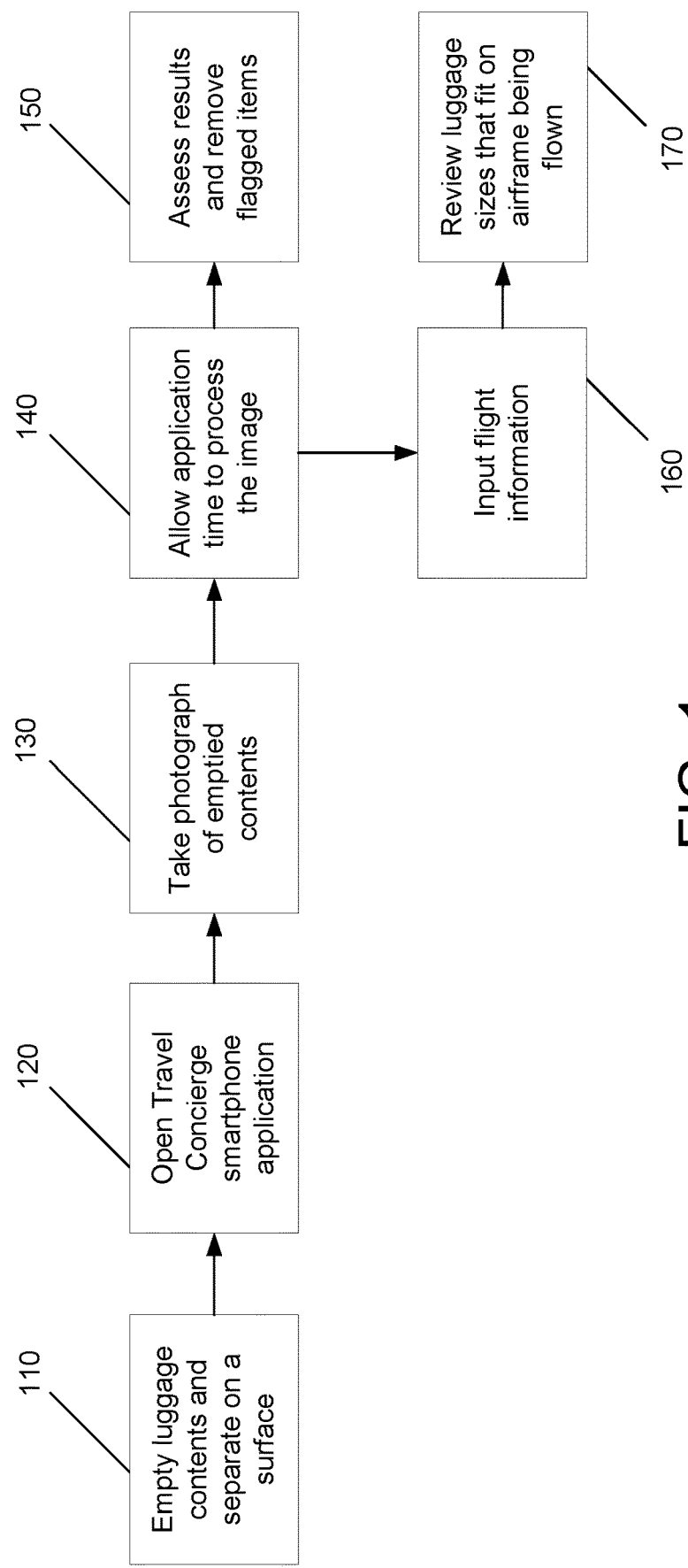
FIG. 1 is a flow diagram illustrating an example of a process of prescreening objects that are not permissible for travel by using a travel concierge mobile application.

FIG. 1 is a flow diagram 100 illustrating an example of a process of prescreening objects that are not permissible for travel by using a travel concierge mobile application. For air travel, as an example, the user may refer to a TSA webpage on "What Can I Bring?" Step 110 involves emptying luggage contents and separating them on a surface such as a floor or the like by a user. In step 120, the user opens or launches a travel concierge mobile/smartphone application. In step 130, the user captures an image such as a still image of a photograph or a moving image of a video of the emptied luggage contents. In step 140, the mobile application is configured to process and analyze the image. In step 150, the mobile application assesses the results of image analysis and flags any objects or items of the emptied luggage contents as impermissible or prohibited items. In addition, the mobile application may prompt the user to input flight information in step 160. In step 170, the mobile application may display information on luggage sizes that fit or are permitted on the airframe being flown to be reviewed by the user.

Figure 2:
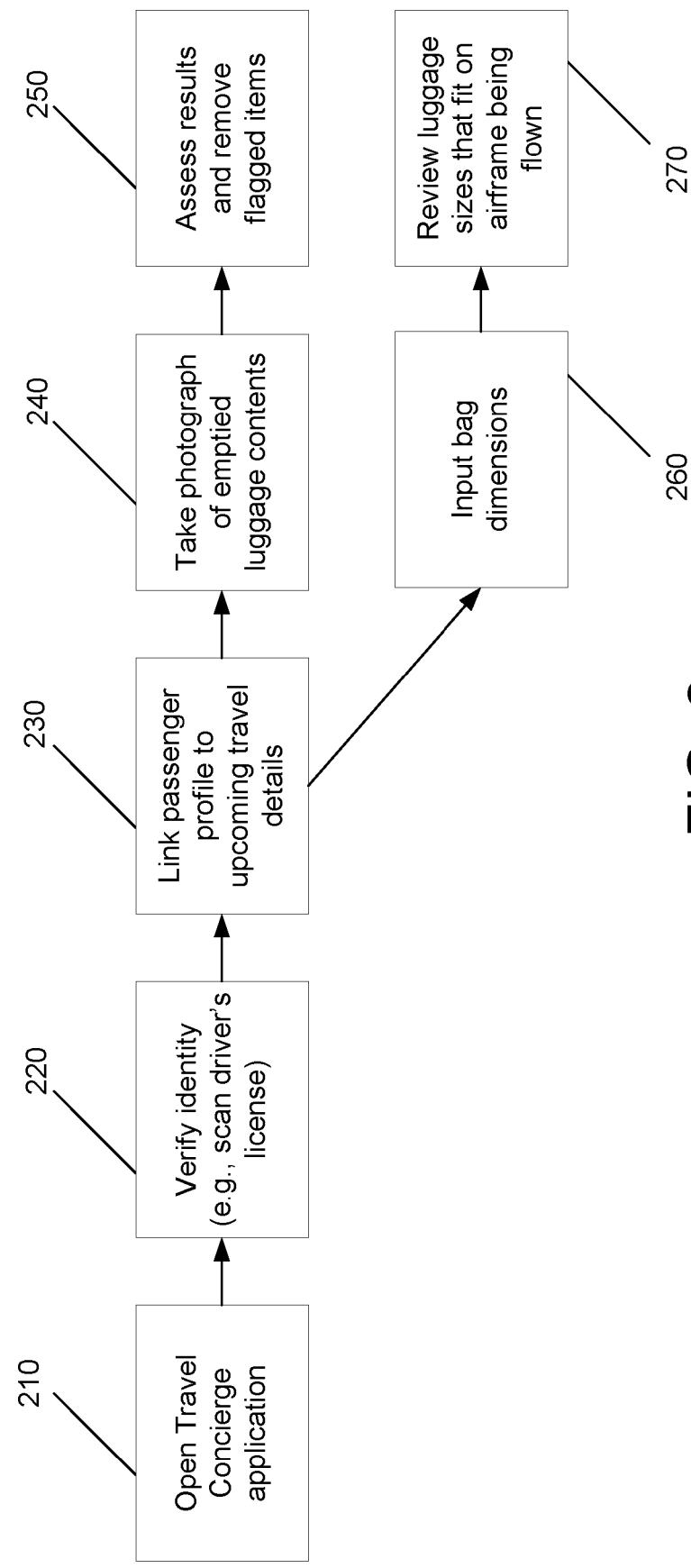
FIG. 2 is a flow diagram illustrating another example of a process of prescreening objects that are not permissible for travel with identity verification.

FIG. 2 is a flow diagram illustrating another example of a process of prescreening objects that are not permissible for travel with identity verification. This example adds identity verification. In step 210, the user opens or launches a travel concierge mobile/smartphone application. In step 220, the user verifies his or her identity, for instance, by scanning his or her driver's license. In step 230, the mobile application links the user's profile to upcoming travel details. In step 240, the user captures an image (still or moving) of the emptied luggage contents. The mobile application may also process and analyze the image. In step 250, the mobile application assesses the results of image analysis and flags any objects or items of the emptied luggage contents as impermissible or prohibited items. In addition, the mobile application may prompt the user to input bag dimensions in step 260. In step 270, the mobile application may display information on luggage sizes that fit or are permitted on the airframe being flown to be reviewed by the user.

Figure 3:
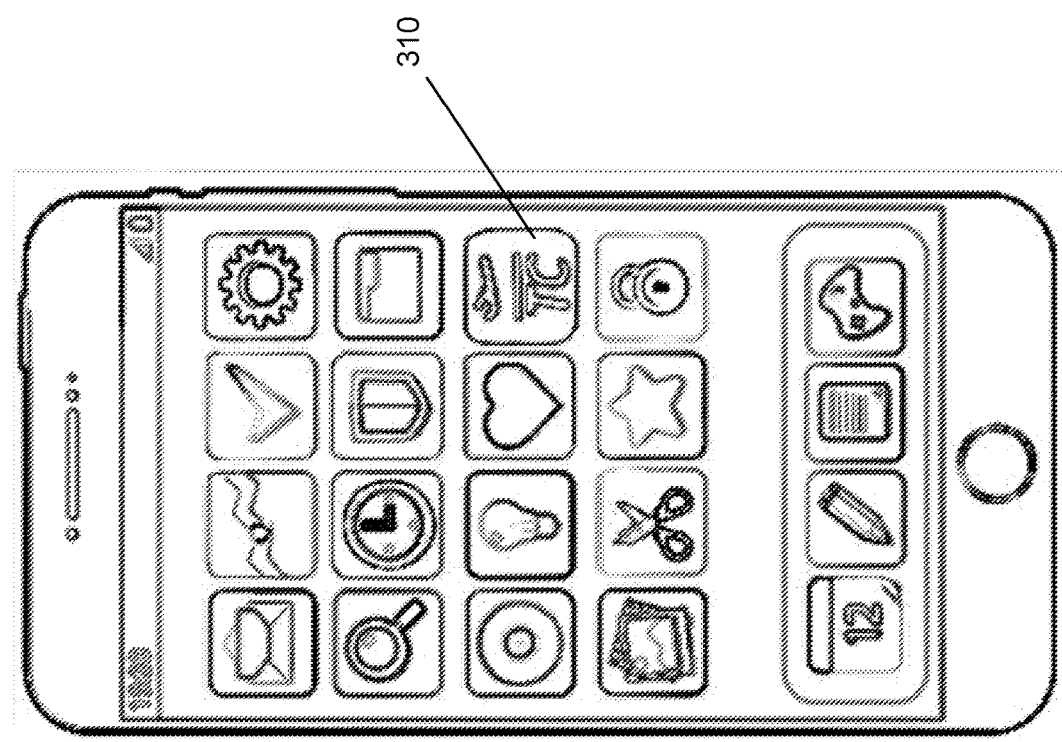
FIG. 3 is a mobile device screen display showing an example of a travel concierge mobile application icon.

FIG. 3 is a mobile device screen display showing an example of a travel concierge mobile application icon.

Figure 4:
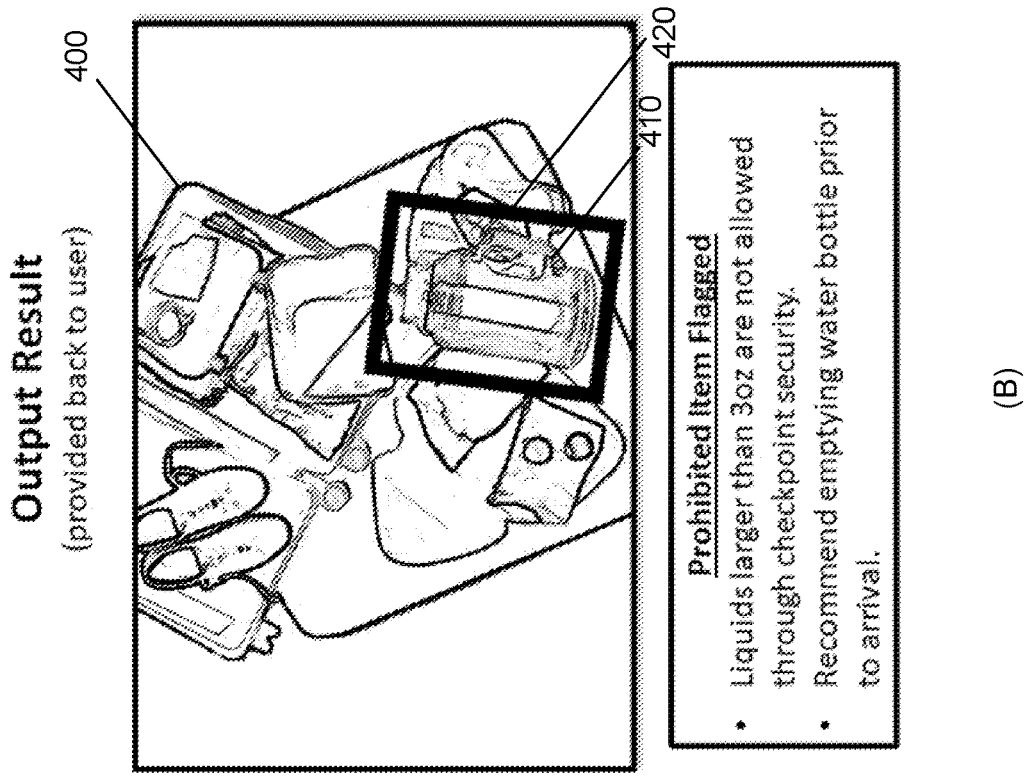
FIG. 4 shows an example of (A) an input image taken of contents of a luggage bag for the travel concierge mobile application to identify any object that is not permissible for travel and (B) an output result of an object identified by the travel concierge mobile application as being not permissible for travel.
Figure 4:
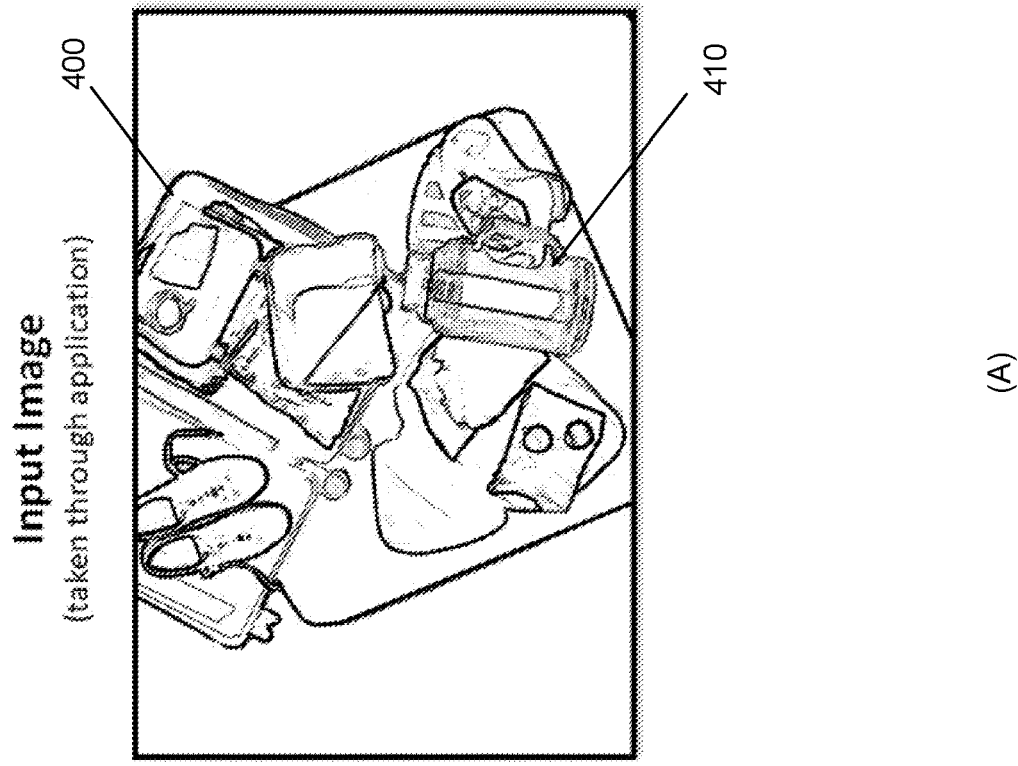

FIG. 4 shows an example of (A) an input image taken of contents of a luggage bag for the travel concierge mobile application to identify any object that is not permissible for travel and (B) an output result of an object identified by the travel concierge mobile application as being not permissible for travel.

The input image of the contents of the luggage 400 is taken through the mobile application. There is a prohibited object 410 which is a bottle that can hold more than 3 oz of liquid. The output result of analyzing the image of the contents of the luggage 400 is presented to the user, e.g., on a display. It flags the prohibited or impermissible bottle 410. For example, the mobile application may place a red box 420 around the bottle 410 to indicate or label it as a likely prohibited item. The liquid container size exceeds the limit permissible on carryon luggage at a security checkpoint. The mobile application may be programmed to recommend emptying the bottle 410 of liquid prior to travel.

Figure 5:
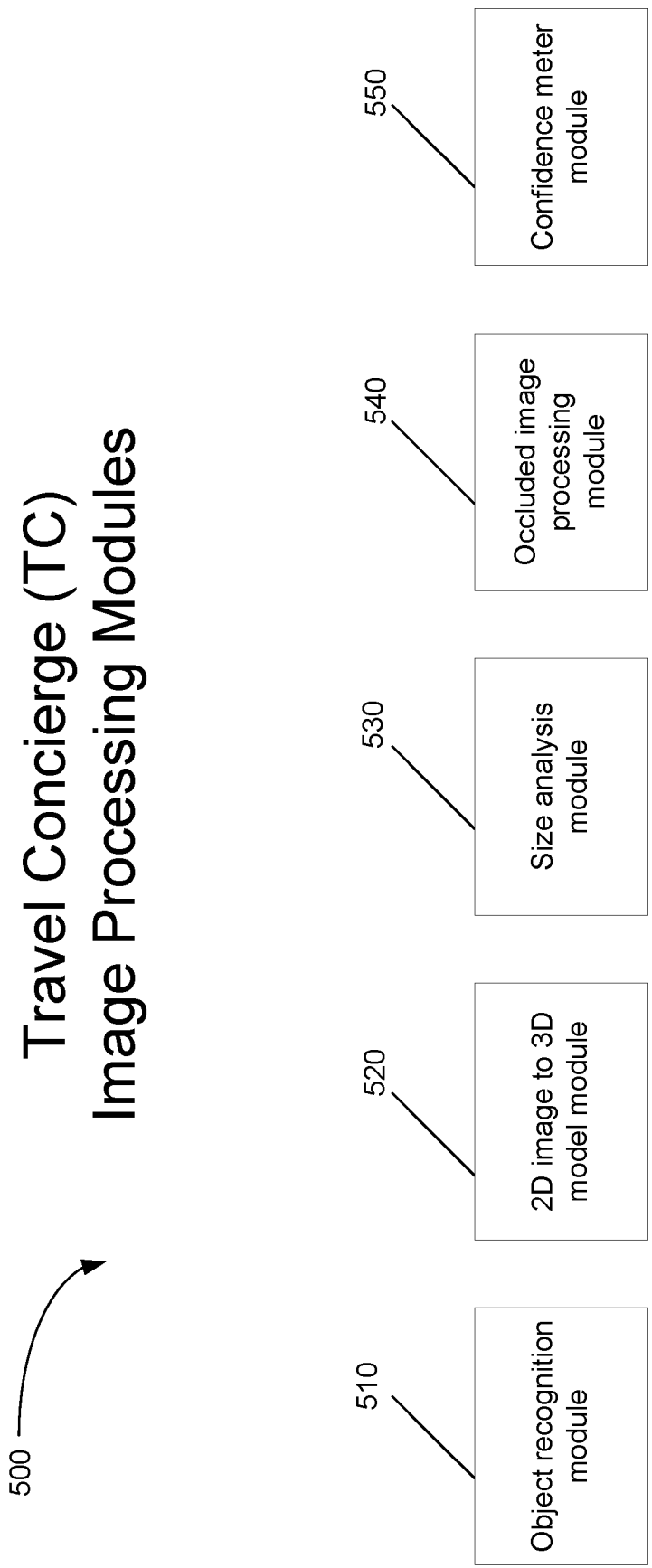
FIG. 5 shows examples of computer modules 500 for processing and analyzing the image of the contents.

FIG. 5 shows examples of computer modules 500 for processing and analyzing the image of the contents. These image processing modules may provide more specific information to the user to assist the user in identifying possible prohibited items. For example, TSA allows 3.4 ounces or less of liquid per container as a carry-on item. All liquids must fit in a quart-size, clear, plastic, zip top bag. The image processing performed by the travel concierge program or app may convert the 2D image to a 3D model, and estimate the size of the container to a good level of confidence. In another example, TSA allows a blade that is no longer than 2.36 inches (6 cm) in length as a carry-on item. It is easy for a blade to be occluded. The image processing performed by the travel concierge program or app may occlusion analyze the blade and estimate the dimensions of the blade.

An object recognition module 510 is configured to pick out and identify object from inputs such as videos and still camera images. It is a key technology behind, for instance, driverless cars, enabling the artificial intelligence (AI) software to recognize a stop sign or to distinguish a pedestrian from a lamppost. Other applications include disease identification in bioimaging, industrial inspection, and robotic vision. Examples of AI tools for object recognition include Amazon Rekognition, Google Reverse Image Search, Azure AI Vision, etc.

A 2D image to 3D model module 520 is configured to transform 2D images into 3D models or assets. An example is Meshy which is a 3D AI toolkit that enables users to transform text or 2D images into 3D assets. Kaedim is another example which uses machine learning to generate a 3D model from a 2D image. The 2D image to 3D model module 520 may be used in combination with the object recognition module 510 to achieve improved image recognition with a higher level of confidence.

A size analysis module 530 is configured to estimate sizes of objects in an image. As one example, the PhotoModeler software extracts measurements and models from photographs taken with a camera. It performs 2D or 3D measurement, photo-digitizing, survey, 3D scanning, reality capture, and other applications of photogrammetry. The size analysis module 530 may be used in conjunction with the object recognition module 510 and/or the 2D image to 3D model module 520 to achieve improved image recognition with a higher level of confidence.

An occluded image processing module 540 is configured to detect occlusion and either alert the user the need to capture an image of the occluded object from another angle or rearrange the contents, or to extrapolate the available data and analyze it for object recognition and/or size estimation. Occlusion sensitivity is a technique for understanding which parts of an image are most important for a deep network's classification. Occlusion-aware detection methods use cues such as depth, motion, or context to infer the presence and location of occluded objects. Multiple hypothesis tracking methods generate and update multiple possible trajectories of objects based on their motion and appearance, and select the most likely one. The occluded image processing module 540 may be used in combination with the object recognition module 510 and/or the 2D image to 3D model module 520 and/or the size analysis module 530 to achieve improved image recognition with a higher level of confidence.

A confidence meter module 550 is configured to calculate the level of confidence in the image processing such as object recognition analysis, 2D image to 3D model analysis, size analysis, and occluded image analysis, individually or in combination. For instance, the confidence meter calculator or module 550 calculates the level of confidence by statistically analyzing the data generated by the object recognition analysis, 2D image to 3D model analysis, size analysis, and/or occluded image analysis to obtain a confidence score. Weighting factors may be used to assign different weights to the contribution of the different analyses to the overall confidence score. In one example, a confidence interval is the probability that a population parameter will fall between a set of values for a certain portion of times. Analysts often use confidence intervals that contain about 95% or 99% of expected observations. The confidence level or score of a data set can be determined by taking half of the size of the confidence interval, multiplying it by the square root of the sample size, and dividing it by the sample standard deviation.

In short, the confidence meter module 550 calculates a confidence score representing a level of confidence by statistically analyzing data generated by analyzing the image processed by image recognition. The user may decide whether to take action with regard to the one or more flagged items based on the confidence score.

In specific embodiments, the method calculates the confidence score by statistically analyzing data generated by analyzing the image processed by two or more image processes of (i) performing object recognition, (ii) performing 2D image to 3D model processing, (iii) performing size analysis, or (iv) performing occluded image processing, of the image of the one or more items.

In one example, the confidence score is calculated by using weighting factors corresponding to the two or more image processes of (i) performing object recognition, (ii) performing 2D image to 3D model processing, (iii) performing size analysis, or (iv) performing occluded image processing, of the image of the one or more items, the weighting factors assigning different weights to contributions of the two or more image processes to the confidence score. The sum of the weighting factors is equal to one.

Figure 6:
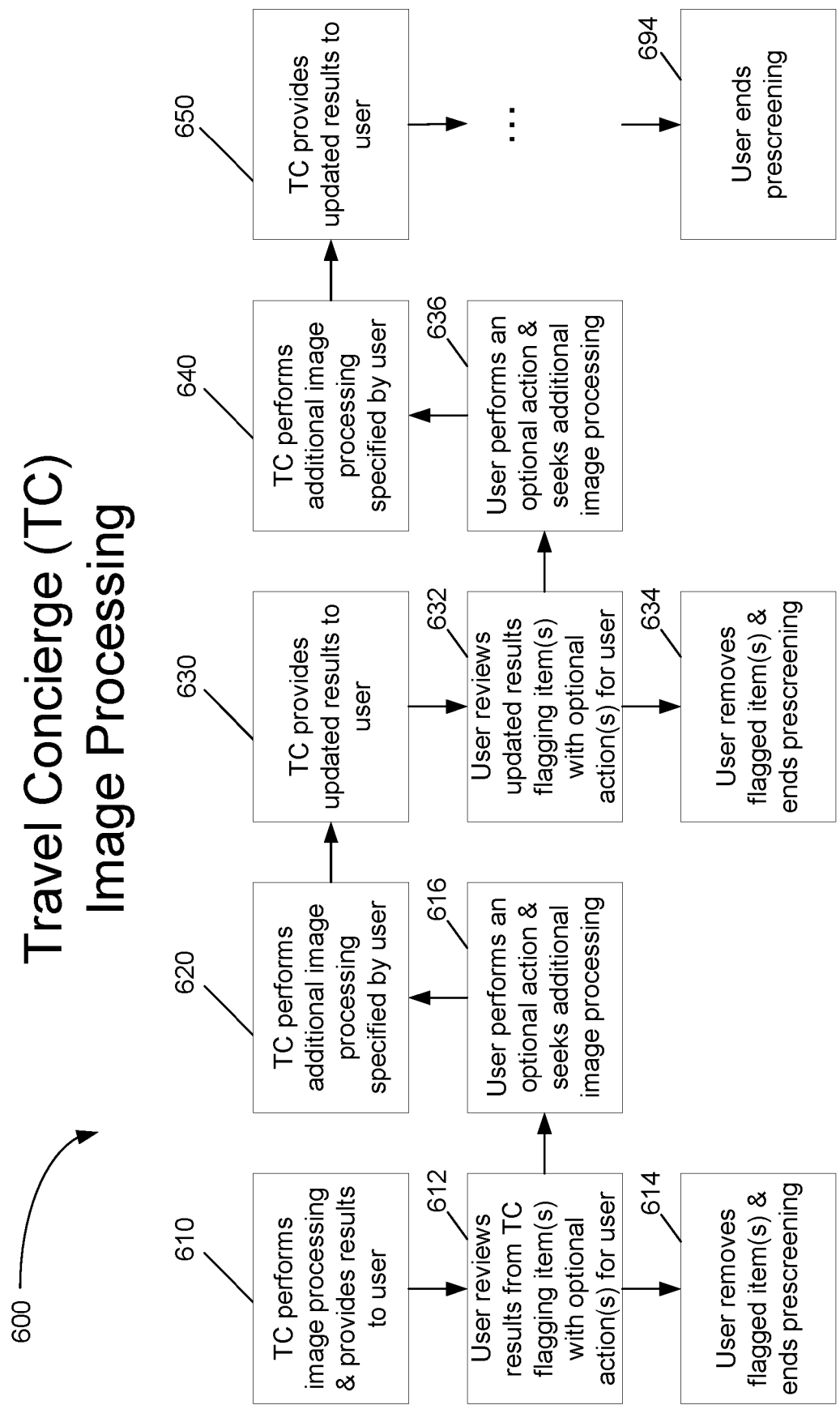
FIG. 6 is a flow diagram illustrating an example of a flow diagram of image processing for prescreening objects.

FIG. 6 is a flow diagram illustrating an example of a flow diagram of image processing 600 for prescreening objects. In step 620, the travel concierge (TC) program or app performs image processing using, for instance, one or more of the object recognition module 510, 2D image to 3D model module 520, size analysis module 530, occluded image processing module 540, and confidence meter module 550. It provides the image processing result to the user. The image processing result may include flagging one or more items (e.g., 410 in FIG. 4) that are potentially prohibited items. It may further include one or more optional actions for the user to take. Examples include taking one or more additional still photographs of the contents from different angles and/or distances as input for the image processing, taking a video of the contents by moving the camera around from different angles and/or distances as input for the image processing, and moving one or more flagged items to different positions (e.g., bringing an occluded item to the forefront or repositioning a flagged item for better object recognition, 2D image to 3D model analysis, or size analysis, etc.). The result may include a confidence score of the image processing and analysis as described above.

In step 612, the user reviews the image processing results from the TC and decides how to proceed. For example, the user may be satisfied with the confidence score (i.e., above a certain preset confidence threshold) and decide to remove the flagged item(s) and end the prescreening in step 614. Alternatively, the user may perform any or all of the one or more optional actions provided by the TC and then requests additional image processing by the TC in step 616. The user may request a general image processing which the TC performs by default by treating the image processing request as a separate, standalone request. The user may instead specify a certain type of image processing. For instance, the user may request that the previous image(s) be included in the analysis to calculate a cumulative confidence score based on the different images of the contents. In another example, the user may specify how the confidence score is to be calculated (e.g., by giving more weight to size analysis).

The TC may be configured to prompt the user to take action with regard to the one or more flagged items. The action for the one or more flagged items includes at least one of (i) taking one or more additional still photographs of the one or more items from different angles or different distances or both as one or more additional images for additional image processing, (ii) taking a video of the one or more items by moving the image capture device around from different angles or different distances or both as one or more additional images for additional image processing, or (iii) moving the one or more flagged items to different positions and capturing one or more additional images for additional image processing. If the user takes no action with regard to the one or more flagged items in response to the prompting, the TC terminates image processing of the one or more items. Alternatively, in response to the action taken by the user, the TC is configured to perform the additional image processing of the one or more additional images by image recognition and analyze the one or more additional images processed by image recognition to determine whether any of the one or more items are listed on the list. If none of the one or more items in the one or more additional images is listed on the list, the TC informs the user that none of the one or more items in the image is listed on the list. If any of the one or more items in the one or more additional images is listed on the list, the TC identifies each item in the one or more additional images which is listed on the list to the user.

In step 620, the TC performs the additional image processing specified by the user. In step 630, the TC provides updated results to the user. The next steps 632, 634, 636, 640, and 650 are similar to previous steps 612, 614, 616, 620, and 630, respectively. If one or more items in the one or more additional images are listed on the list as one or more updated flagged items, the TC prompts the user to take action with regard to the one or more updated flagged items. The action for the one or more updated flagged items includes at least one of (i) taking one or more additional still photographs of the one or more items from different angles or different distances or both as one or more updated additional images for additional image processing, (ii) taking a video of the one or more items by moving the image capture device around from different angles or different distances or both as one or more updated additional images for additional image processing, or (iii) moving the one or more updated flagged items to different positions and capturing one or more updated additional images for additional image processing. The TC then calculates an updated confidence score representing a level of confidence by statistically analyzing data generated by analyzing the one or more additional images processed by image recognition. The TC may determine whether any of the one or more items are listed on the list by a combination of analyzing the original image and analyzing the one or more additional images processed by image recognition. The user decides whether to take action with regard to the one or more updated flagged items based on the updated confidence score.

The image processing stops when the user removes the flagged item(s) and ends the prescreening (614, 634, etc.) or when the user ends the prescreening process for any or no reason in step 694. For example, the user is satisfied with the confidence score and the results do not contain any more flagged item(s).

Figure 7:
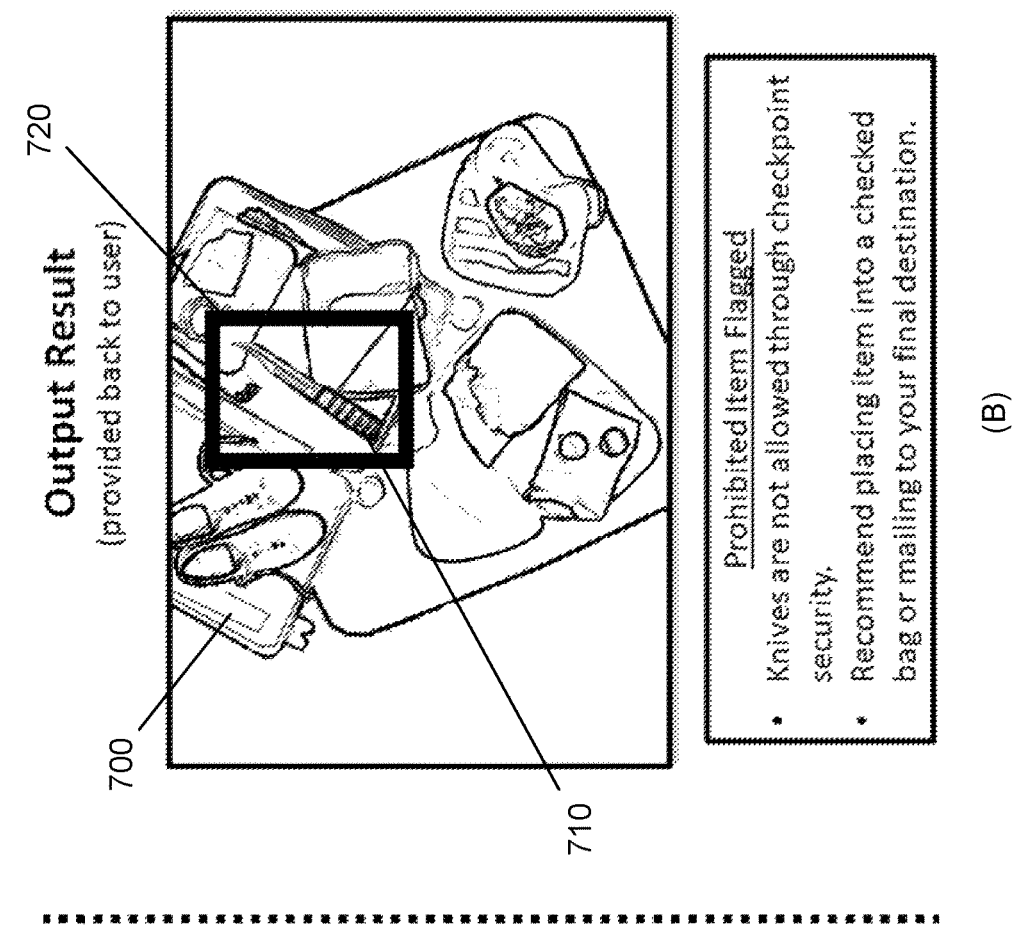
FIG. 7 shows another example of (A) an input image taken of contents of a luggage bag for the travel concierge mobile application to identify any object that is not permissible for travel and (B) an output result of an object identified by the travel concierge mobile application as being not permissible for travel.
Figure 7:
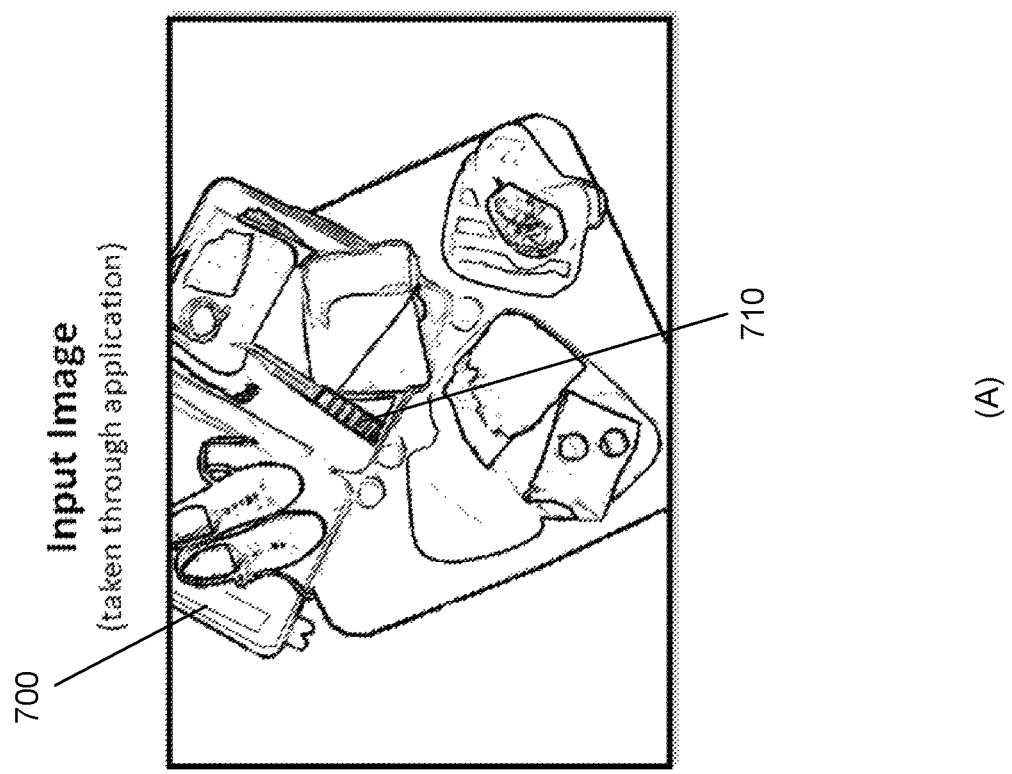

FIG. 7 shows another example of (A) an input image taken of contents of a luggage bag for the travel concierge mobile application to identify any object that is not permissible for travel and (B) an output result of an object identified by the travel concierge mobile application as being not permissible for travel.

The input image of the contents of the luggage 700 is taken through the mobile application. There is a prohibited object 710 which is a knife. The output result of analyzing the image of the contents of the luggage 700 is presented to the user, e.g., on a display. It flags the prohibited or impermissible knife 710. For example, the mobile application may place a red box 720 around the knife 710 to indicate or label it as a likely prohibited item. The mobile application may be programmed to recommend placing the knife 710 in a checked bag or mailing it to the final destination of travel.

Figure 8:
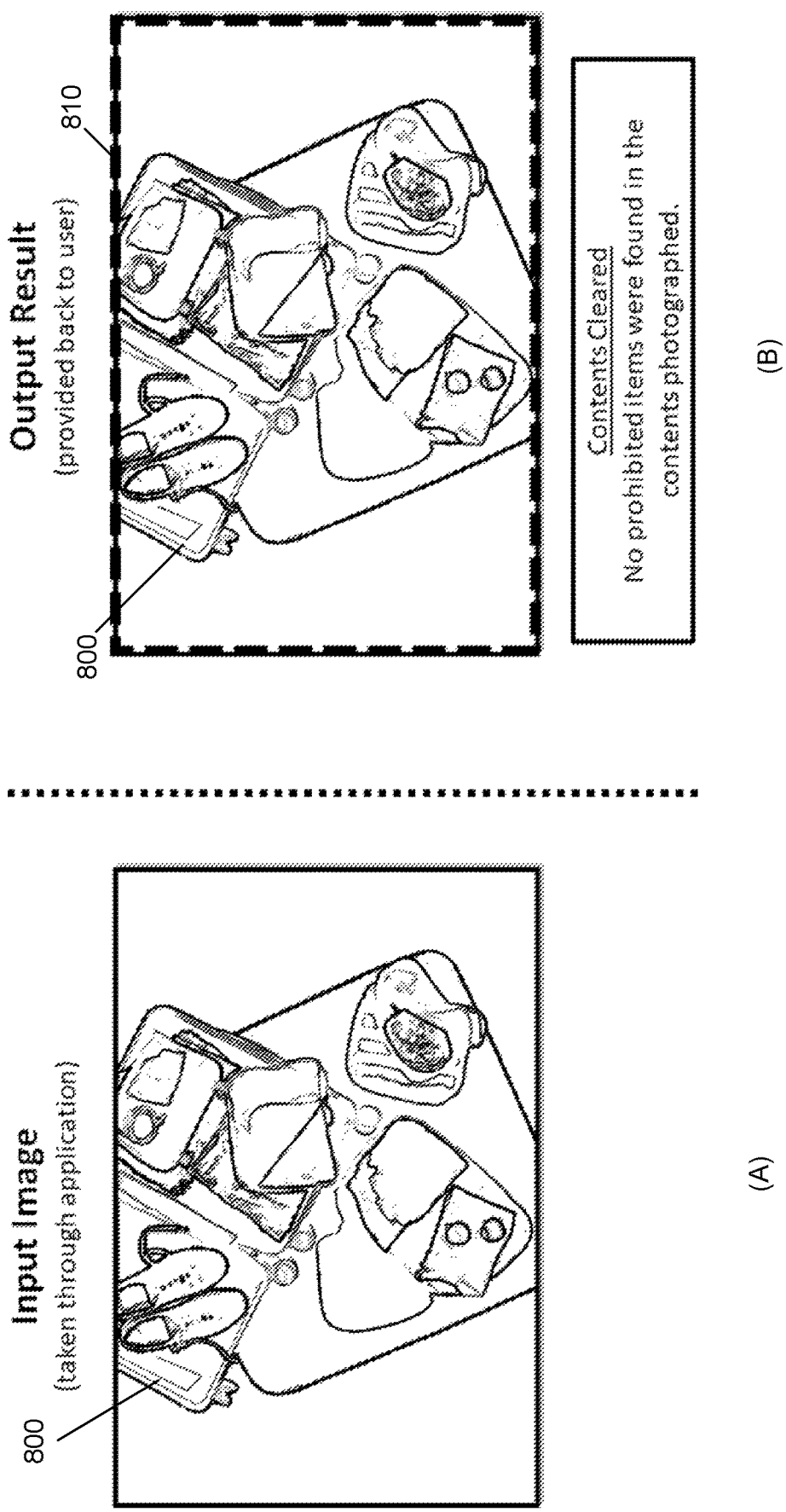
FIG. 8 shows an example of (A) an input image taken of contents of a luggage bag for the travel concierge mobile application to identify any object that is not permissible for travel and (B) an output result of the travel concierge mobile application identifying no prohibited items and clearing all contents.

FIG. 8 shows an example of (A) an input image taken of contents of a luggage bag for the travel concierge mobile application to identify any object that is not permissible for travel and (B) an output result of the travel concierge mobile application identifying no prohibited items and clearing all contents.

The input image of the contents of the luggage 800 is taken through the mobile application. The image shows no prohibited objects. The output result of analyzing the image of the contents of the luggage 800 is presented to the user, e.g., on a display. It informs the user that the contents of the luggage 800 are cleared. For example, the mobile application may place a green box 810 around the entire content of the luggage 800 or the entire image to indicate or label it as cleared.

Figure 9:
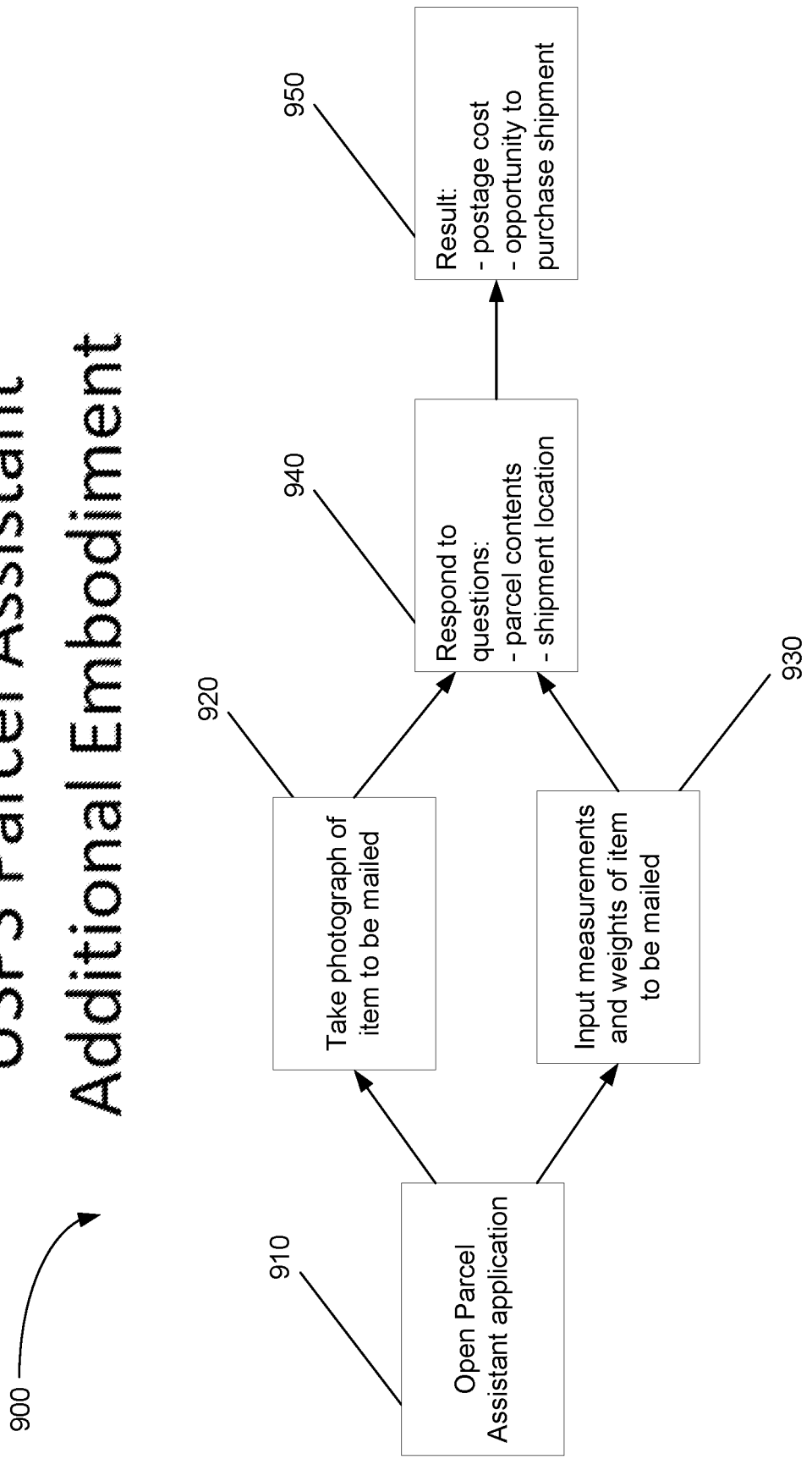
FIG. 9 is a flow diagram illustrating an example of a process of prescreening objects that are not permissible for shipping by using a USPS parcel assistant mobile application.

FIG. 9 is a flow diagram illustrating an example of a process of prescreening objects that are not permissible for shipping by using a USPS parcel assistant mobile application. In step 910, the user opens or launches a parcel assistant mobile/smartphone application. In step 920, the user captures an image such as a still image of a photograph or a moving image of a video of the item to be mailed. The mobile application may also process and analyze the image. In addition, the mobile application may prompt the user to input measurements and weights of the item to be mailed in step 930. In step 940, based on the image processing and analysis, the mobile application prompts the user to respond to certain questions regarding the parcel contents and the shipping destination. This may lead to displaying information to the user regarding the item and/or instructions to the user on properly handling the item for shipping or alternative shipping options. Assuming that the item can be shipped, the mobile application will present to the user the shipping cost and the opportunity to pay for the shipping in step 950.

Figure 10:
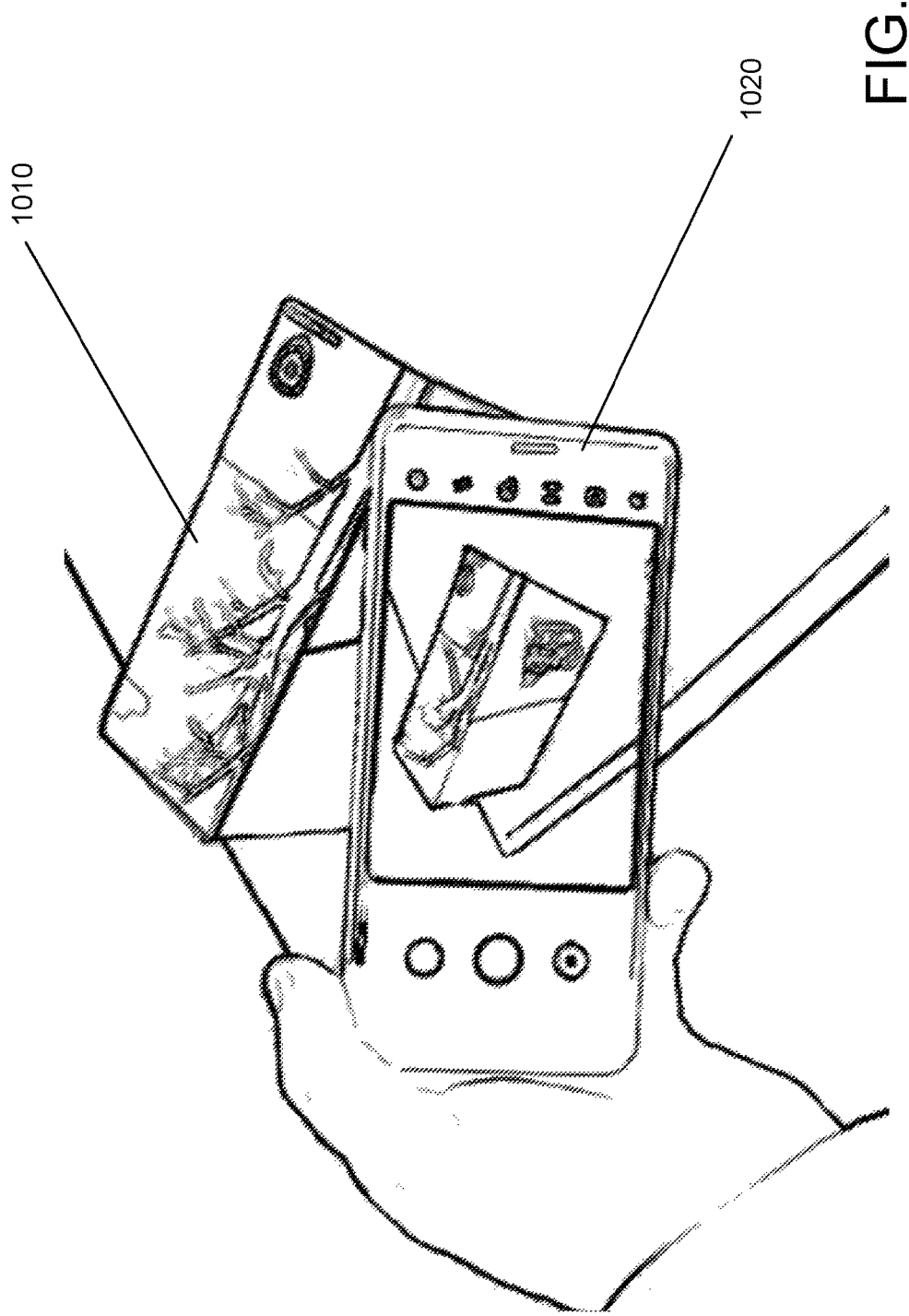
FIG. 10 shows an example of capturing an input image of an item to be identified as a permissible object or a prohibited object for shipping by the USPS parcel assistant mobile application.

FIG. 10 shows an example of capturing an input image of an item to be identified as a permissible object or a prohibited object for shipping by the USPS parcel assistant mobile application in step 920 above.

Figure 11:
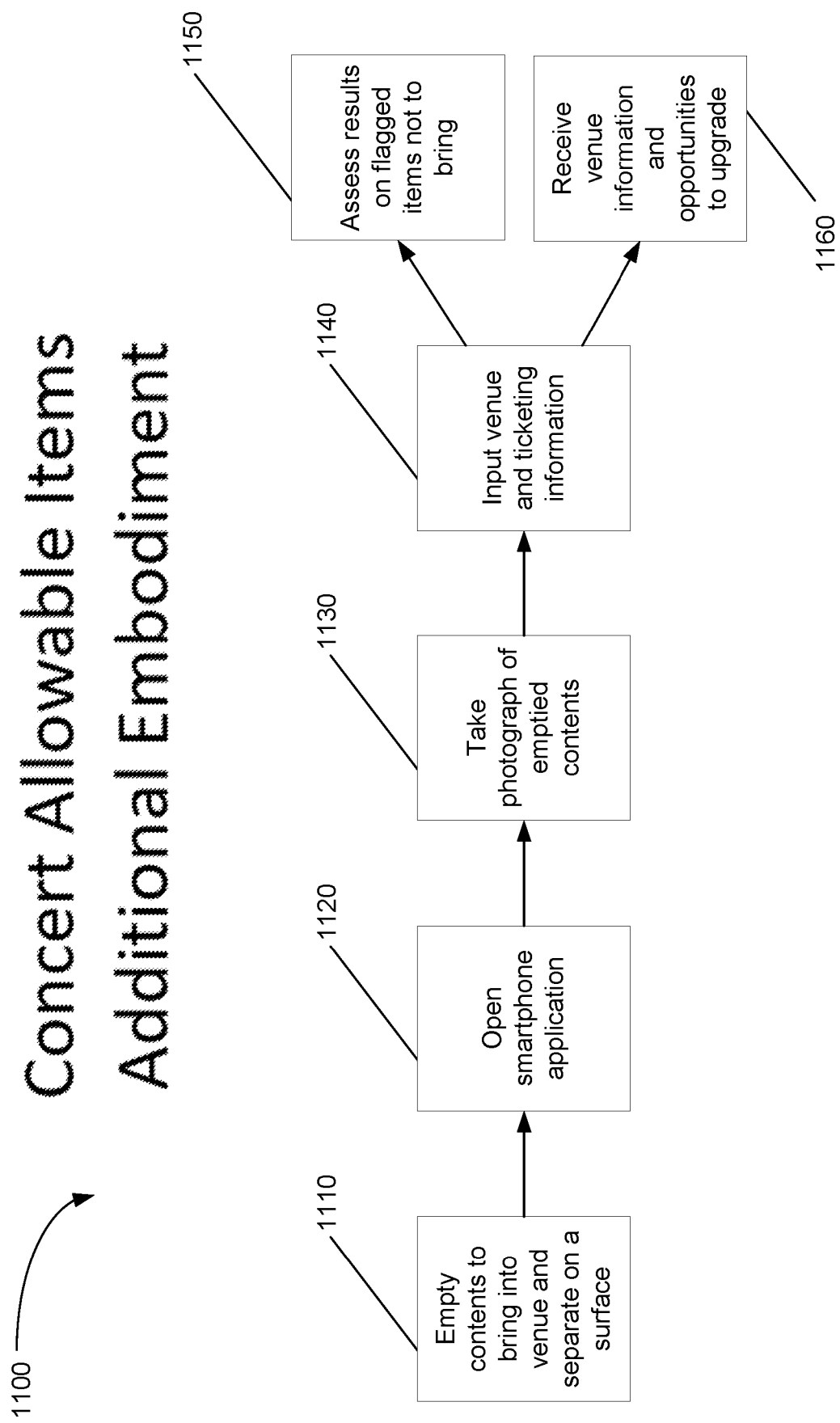
FIG. 11 is a flow diagram illustrating an example of a process of prescreening objects that are not permissible for entry into a venue by using a personal items check mobile application.

FIG. 11 is a flow diagram illustrating an example of a process of prescreening objects that are not permissible for entry into a venue by using a personal items check mobile application. In step 1110, the user empties contents he or she intends to bring into a venue and separate them out, for instance, on a surface such as a floor. In step 1120, the user opens or launches a venue concierge or personal items check mobile/smartphone application. In step 1130, the user captures an image such as a still image of a photograph or a moving image of a video of the personal items or contents using the mobile application. In step 1140, the mobile application prompts the user to input the venue and ticketing information. In step 1150, based on processing and analyzing the image of the contents, the mobile application informs the user of the results and flags any prohibited items included in the contents which the user may not bring into the venue. In step 1160, the user receives the venue information and opportunities to upgrade.

The mobile application may further receive or retrieve category information of admission or acceptance of the one or more items for the user. The list includes different items for different categories of admission or acceptance. For instance, items not admissible under a lower category (e.g., coach or general admission) are admissible under a higher category (e.g., first class or VIP admission). The mobile application will analyze the image processed by image recognition to determine whether any of the one or more items are listed on the list based on the category information. If the item is not admissible under the current category, the mobile application may provide pertinent information regarding the venue to the user and present opportunities to upgrade to the category or ticket level which may allow the user to bring into the venue certain personal items prohibited at the lower category or ticket level.

Figure 12:
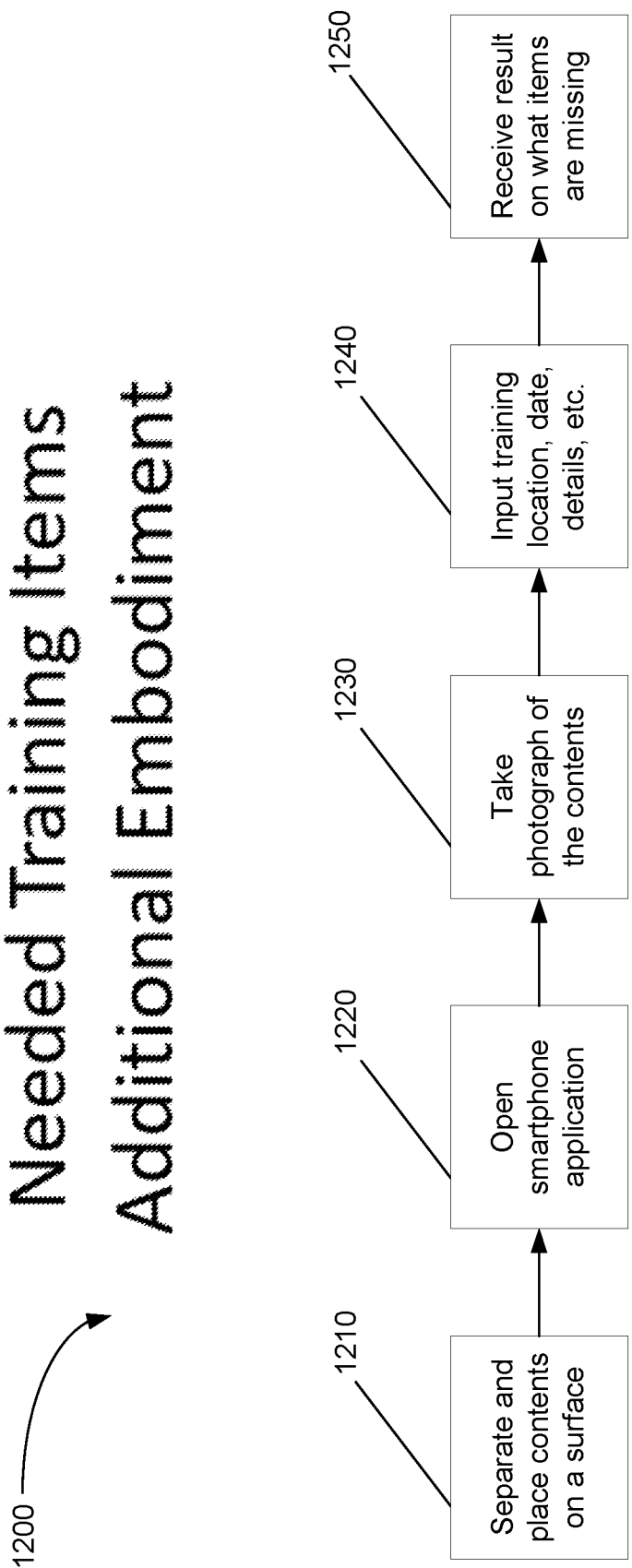
FIG. 12 is a flow diagram illustrating an example of a process of prescreening objects that are required for training to identify any missing items by using a training items checklist mobile application.

FIG. 12 is a flow diagram illustrating an example of a process of prescreening objects that are required for training to identify any missing items by using a training items checklist mobile application. In step 1210, the user separates the training items and places them, for instance, on a surface such as a floor. In step 1220, the user opens or launches a training concierge or training items checklist mobile/smartphone application. In step 1230, the user captures an image such as a still image of a photograph or a moving image of a video of the training items using the mobile application. In step 1240, the mobile application prompts the user to input the training location, date, details, etc. In step 1250, based on processing and analyzing the image (still or moving) of the training items, the mobile application informs the user of the results on any training items on the checklist that may be missing from those captured in the image (still or moving).

The TC is configured to analyzes the image processed by image recognition to determine whether one or more items in the image include all items listed on the checklist. If the one or more items in the image include all items listed on the checklist, the TC informs the user that none of the items listed on the checklist is missing. If the one or more items in the image do not include all items listed on the checklist, the TC identifies each item which is missing from the checklist.

Image Recognition

Image recognition software and apps are commercially available. Examples include Google Lens, Aipoly Vision, TapTapSee, Cam Find, Flow, Amazon Rekognition, etc. The following outlines an approach to create the prescreening mobile application including the image recognition feature.

To create the prescreening mobile application including image recognition, phase I is executed to explore, develop, train, and demonstrate a machine learning algorithm trained on, for instance, an exploratory set of TSA-prohibited items (PI) (e.g., at least 30 diverse items) with a range of orientations, lighting, shading, and surface backgrounds using a smartphone camera. The supervised training set may include benign items that are commonly found in carryon baggage (n>100). The PI detection rate may be at least 90% and the false alarm rate may be less than 10%.

Phase II is executed to provide the mobile application with a detection capability of at least one exemplar of each of the TSA-PIs and about 500 of the most common benign personal articles in carryon bags. This capability (>90% detection and <10% false alarm) may be demonstrated on a smartphone with a set of PIs drawn from the list and independently sourced benign items. The mobile application is not brittle and does not use features which are invalid or irrelevant to the objective. It may be programmed to offer some explanation of its decisions on identifying impermissible or prohibited items.

Phase III involves launching a commonly downloadable (Apple/Android) mobile application to assess passenger carryon items. DHS/TSA may conduct a compliance assessment to ensure that detection of all items in the prohibited items list has been sufficiently achieved. The implementation may be accomplished by TSA or commercialization of this technology could be a phone application of similar nature with capital potentially being generated by advertisements. This technology could be trained off of a new dataset for detection or identification of other specific items of interest to TSA.

The mobile application may further be programmed to submit the captured image (still or moving) data to TSA known traveler's database, receive passenger flight information of the user, determine the luggage size from the captured image or text input, compare the luggage size to airline database for allowable luggage size, and notify the user of any issue based on the comparison.

The prescreening technology may be used for prescreening packages for shipping service. It may be used to identify prohibited items that cannot be shipped, determine the package size based on the captured image(s), and calculate the shipping cost.

The virtual concierge mobile application may lead to a faster/higher TSA checkpoint throughput, more positive customer feedback to TSA, and fewer confiscated items at airport checkpoints. It addresses the issue of continued unsureness by the general public about TSA checkpoint regulations. It reduces or prevents continued packing of prohibited items at the current rate by the general public and checkpoint saturation due to screening demand exceeding capacity. As a result, as potential passenger delays due to the detection of TSA prohibited items are reduced or eliminated, the passenger will not need to arrive at the airport earlier than necessary.

Computer System

Figure 13:
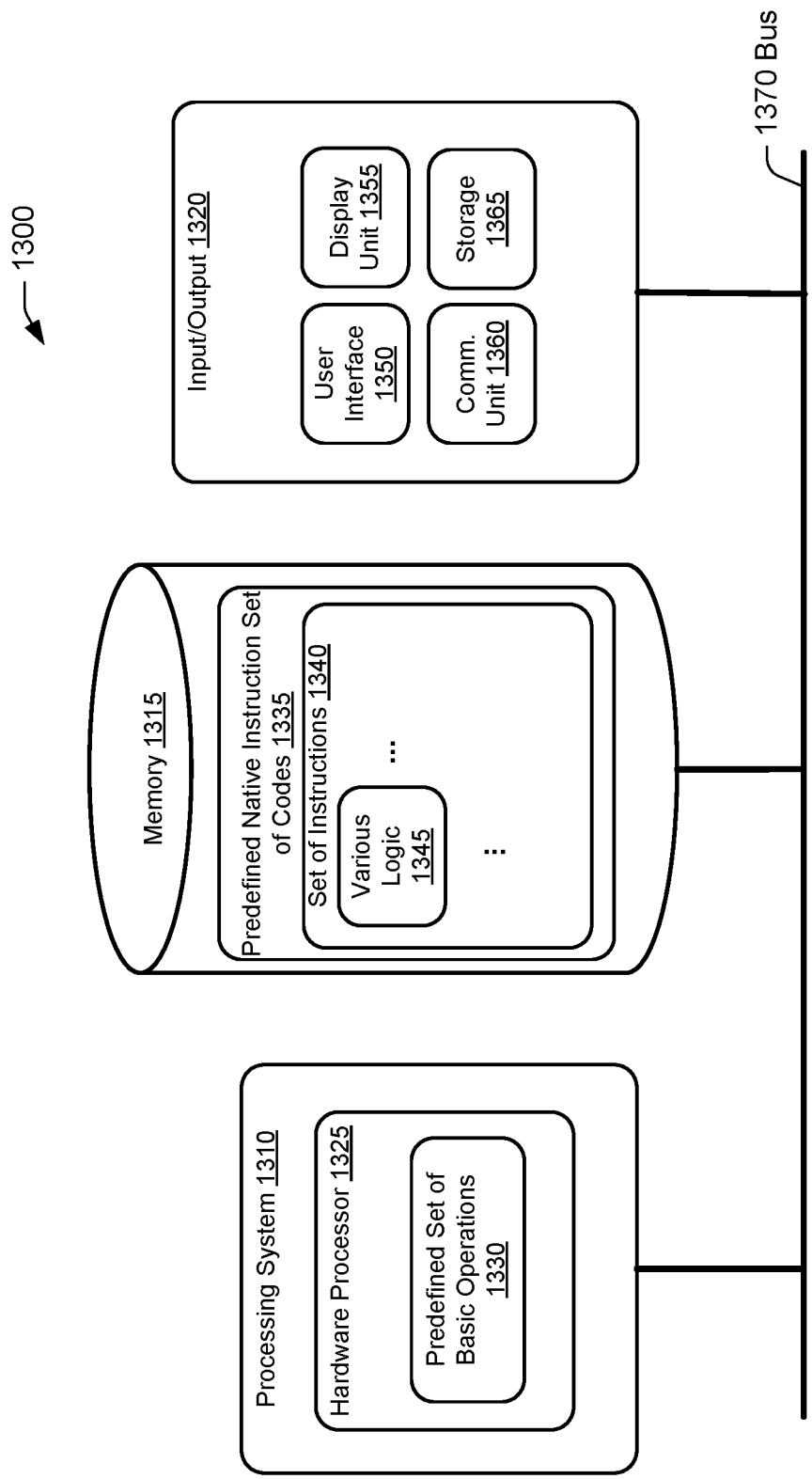
FIG. 13 illustrates a computing system including logic according to an embodiment.

FIG. 13 illustrates a computing system 1300 including logic according to an embodiment. The computing system 1300 includes a processing system 1310 having a hardware processor 1325 configured to perform a predefined set of basic operations 1330 by loading corresponding ones of a predefined native instruction set of codes 1335 as stored in the memory 1315. The computing system 1300 further includes input/output 1320 having user interface 1350, display unit 1355, communication unit 1360, and storage 1365.

The memory 1315 is accessible to the processing system 1310 via the bus 1370. The memory 1315 includes the predefined native instruction set of codes 1335, which constitute a set of instructions 1340 selectable for execution by the hardware processor 1325. In an embodiment, the set of instructions 1340 include logic 1345 representing various processor logic and/or modules. An example of such logic 1345 is set forth in greater detail with respect to the flow diagrams illustrated in FIGS. 1, 2, 9, 11, and 12. Each of the above-mentioned algorithms can be a separate system or a module in an overall computer system 1300. The various logic 1345 is stored in the memory 1315 and comprises instructions 1340 selected from the predefined native instruction set of codes 1335 of the hardware processor 1325, adapted to operate with the processing system 1310 to implement the process or processes of the corresponding logic 1345.

A hardware processor may be thought of as a complex electrical circuit that is configured to perform a predefined set of basic operations in response to receiving a corresponding basic instruction selected from a predefined native instruction set of codes. The predefined native instruction set of codes is specific to the hardware processor; the design of the processor defines the collection of basic instructions to which the processor will respond, and this collection forms the predefined native instruction set of codes. A basic instruction may be represented numerically as a series of binary values, in which case it may be referred to as a machine code. The series of binary values may be represented electrically, as inputs to the hardware processor, via electrical connections, using voltages that represent either a binary zero or a binary one. These voltages are interpreted as such by the hardware processor. Executable program code may therefore be understood to be a set of machine codes selected from the predefined native instruction set of codes. A given set of machine codes may be understood, generally, to constitute a module. A set of one or more modules may be understood to constitute an application program or "app." An app may interact with the hardware processor directly or indirectly via an operating system. An app may be part of an operating system.

A computer program product is an article of manufacture that has a computer-readable medium with executable program code that is adapted to enable a processing system to perform various operations and actions. Non-transitory computer-readable media may be understood as a storage for the executable program code. Whereas a transitory computer-readable medium holds executable program code on the move, a non-transitory computer-readable medium is meant to hold executable program code at rest. Non-transitory computer-readable media may hold the software in its entirety, and for longer duration, compared to transitory computer-readable media that holds only a portion of the software and for a relatively short time. The term, "non-transitory computer-readable medium," specifically excludes communication signals such as radio frequency signals in transit. The following forms of storage exemplify non-transitory computer-readable media: removable storage such as a USB disk, a USB stick, a flash disk, a flash drive, a thumb drive, an external SSD, a compact flash card, an SD card, a diskette, a tape, a compact disc, an optical disc; secondary storage such as an internal hard drive, an internal SSD, internal flash memory, internal non-volatile memory, internal DRAM, ROM, RAM, and the like; and the primary storage of a computer system.

Different terms may be used to express the relationship between executable program code and non-transitory computer-readable media. Executable program code may be written on a disc, embodied in an application-specific integrated circuit, stored in a memory chip, or loaded in a cache memory, for example. Herein, the executable program code may be said, generally, to be "in" or "on" a computer-readable media. Conversely, the computer-readable media may be said to store, to include, to hold, or to have the executable program code.

The inventive concepts taught by way of the examples discussed above are amenable to modification, rearrangement, and embodiment in several ways. Accordingly, although the present disclosure has been described with reference to specific embodiments and examples, persons skilled in the art will recognize that changes may be made in form and detail without departing from the spirit and scope of the disclosure.

Certain attributes, functions, steps of methods, or substeps of methods described herein may be associated with physical structures or components, such as a module of a physical device that, in implementations in accordance with this disclosure, make use of instructions (e.g., computer executable instructions) that are embodied in hardware, such as an application specific integrated circuit, or that may cause a computer (e.g., a general-purpose computer) executing the instructions to have defined characteristics. There may be a combination of hardware and software such as processor implementing firmware, software, and so forth so as to function as a special purpose computer with the ascribed characteristics. For example, in embodiments a module may comprise a functional hardware unit (such as a self-contained hardware or software or a combination thereof) designed to interface the other components of a system such as through use of an API. In embodiments, a module is structured to perform a function or set of functions, such as in accordance with a described algorithm. This disclosure may use nomenclature that associates a component or module with a function, purpose, step, or sub-step to identify the corresponding structure which, in instances, includes hardware and/or software that function for a specific purpose. For any computer-implemented embodiment, "means plus function" elements will use the term "means;" the terms "logic" and "module" and the like have the meaning ascribed to them above, if any, and are not to be construed as means.

An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not to be taken as limiting or restricting the systems, techniques, approaches, methods, devices to those appearing in any section. Rather, the teachings and disclosures herein can be combined, rearranged, with other portions of this disclosure and the knowledge of one of ordinary skill in the art. It is the intention of this disclosure to encompass and include such variation.

The indication of any elements or steps as "optional" does not indicate that all other or any other elements or steps are mandatory. The claims define the invention and form part of the specification. Limitations from the written description are not to be read into the claims.

What is claimed is:

1. A prescreening system comprising:
an image capture device to capture an image of one or more items for a user; and
a memory and a processor configured to:
process digitally the image of the one or more items by image recognition, the processor including (i) an object recognition module to perform object recognition, (ii) a 2D image to 3D model processing module to perform 2D image to 3D model processing, (iii) a size analysis module to perform size analysis, and (iv) an occluded image processing module to perform occluded image processing, of the image of the one or more items;
analyze the image processed by image recognition to determine whether any of the one or more items are listed on a list;
if none of the one or more items in the image is listed on the list, inform the user that none of the one or more items in the image is listed on the list; and
if any of the one or more items in the image is listed on the list as one or more flagged items, identify each item in the image which is listed on the list to the user;
calculate a confidence score representing a level of confidence by statistically analyzing data generated by analyzing the image processed by image recognition and by using weighting factors corresponding to image processes of the object recognition module, the 2D image to 3D model processing module, the size analysis module, and the occluded image processing module, of the image of the one or more items, the weighting factors assigning different weights to contributions of the image processes to the confidence score; and
prompt the user to take action with regard to the one or more flagged items based on the confidence score, the action for the one or more flagged items including at least one of (i) taking one or more additional still photographs of the one or more items from different angles or different distances or both as one or more additional images for additional image processing by image recognition, (ii) taking a video of the one or more items by moving the image capture device around from different angles or different distances or both as one or more additional images for additional image processing by image recognition, or (iii) moving the one or more flagged items to different positions and capturing one or more additional images for additional image processing by image recognition.

2. The prescreening system of claim 1, wherein one or more items in the image are listed on the list as one or more flagged items, the processor being configured to:
if the user takes no action with regard to the one or more flagged items in response to the prompting, terminate image processing of the one or more items; and
in response to the action taken by the user,
perform the additional image processing of the one or more additional images by image recognition;
analyze the one or more additional images processed by image recognition to determine whether any of the one or more items are listed on the list;
if none of the one or more items in the one or more additional images is listed on the list, inform the user that none of the one or more items in the image is listed on the list; and
if any of the one or more items in the one or more additional images is listed on the list, identify each item in the one or more additional images which is listed on the list to the user.

3. The prescreening system of claim 1,
wherein performing the additional image processing of the one or more additional images by image recognition comprises at least one of (i) performing object recognition by the object recognition module, (ii) performing 2D image to 3D model processing by the 2D image to 3D model processing module, (iii) performing size analysis by the size analysis module, or (iv) performing occluded image processing by the occluded image processing module, of the one or more additional images.

4. The prescreening system of claim 3, wherein one or more items in the one or more additional images are listed on the list as one or more updated flagged items, and the processor is configured to:
prompt the user to take action with regard to the one or more updated flagged items, the action for the one or more updated flagged items including at least one of (i) taking one or more additional still photographs of the one or more items from different angles or different distances or both as one or more updated additional images for additional image processing by image recognition, (ii) taking a video of the one or more items by moving the image capture device around from different angles or different distances or both as one or more updated additional images for additional image processing by image recognition, or (iii) moving the one or more updated flagged items to different positions and capturing one or more updated additional images for additional image processing by image recognition; and
calculate an updated confidence score representing a level of confidence by statistically analyzing data generated by analyzing the one or more additional images processed by image recognition;
wherein the user is prompted to take action with regard to the one or more updated flagged items based on the updated confidence score.

5. The prescreening system of claim 1, wherein the processor is configured to:
determine whether any of the one or more items are listed on the list by a combination of analyzing the image and analyzing the one or more additional images processed by image recognition.

6. The prescreening system of claim 1, wherein the list comprises one of (i) a list of prohibited carryon items for travel on a commercial airline, (ii) a list of prohibited items for entry into a venue, or (iii) a list of prohibited items for shipping service.

7. A prescreening system comprising:
an image capture device to capture an image of one or more items for a user; and
a memory and a processor configured to:
process digitally the image of the one or more items by image recognition, the processor including (i) an object recognition module to perform object recognition, (ii) a 2D image to 3D model processing module to perform 2D image to 3D model processing, (iii) a size analysis module to perform size analysis, and (iv) an occluded image processing module to perform occluded image processing, of the image of the one or more items;
analyze the image processed by image recognition to determine whether any of the one or more items are listed on a list;
if none of the one or more items in the image is listed on the list, inform the user that none of the one or more items in the image is listed on the list;
if any of the one or more items in the image is listed on the list as one or more flagged items, identify each item in the image which is listed on the list to the user; and
receive travel carrier information from the user;
the list comprising a list of prohibited items for travel on a travel carrier identified in the travel carrier information.

8. The prescreening system of claim 1, wherein the processor is configured to:
receive category information of the one or more items for the user, wherein the list includes different items for different categories; and
analyze the image processed by image recognition to determine whether any of the one or more items are listed on the list based on the category information.

9. A prescreening system comprising:
an image capture device to capture an image of one or more items for a user; and
a memory and a processor configured to:
process digitally the image of the one or more items by image recognition, the processor including (i) an object recognition module to perform object recognition, (ii) a 2D image to 3D model processing module to perform 2D image to 3D model processing, (iii) a size analysis module to perform size analysis, and (iv) an occluded image processing module to perform occluded image processing, of the image of the one or more items;
analyze the image processed by image recognition to determine whether the one or more items in the image include all items listed on a checklist;
if the one or more items in the image include all items listed on the checklist, inform the user that none of the items listed on the checklist is missing; and
if the one or more items in the image do not include all items listed on the checklist, identify each item which is missing from the checklist as one or more flagged items.

10. A non-transitory computer-readable recording medium storing a program including instructions that cause a processor to execute a prescreening operation, comprising:
capturing an image of one or more items for a user using an image capture device;
digitally processing the image of the one or more items by image recognition, including (i) performing object recognition, (ii) performing 2D image to 3D model processing, (iii) performing size analysis, and (iv) performing occluded image processing, of the image of the one or more items;
analyzing the image processed by image recognition to determine whether any of the one or more items are listed on a list;
if none of the one or more items in the image is listed on the list, informing the user that none of the one or more items in the image is listed on the list; and
if any of the one or more items in the image is listed on the list as one or more flagged items, identifying each item in the image which is listed on the list to the user;
calculating a confidence score representing a level of confidence by statistically analyzing data generated by analyzing the image processed by image recognition and by using weighting factors corresponding to image processes of the object recognition module, the 2D image to 3D model processing module, the size analysis module, and the occluded image processing module, of the image of the one or more items, the weighting factors assigning different weights to contributions of the image processes to the confidence score; and
prompting the user to take action with regard to the one or more flagged items based on the confidence score, the action for the one or more flagged items including at least one of (i) taking one or more additional still photographs of the one or more items from different angles or different distances or both as one or more additional images for additional image processing by image recognition, (ii) taking a video of the one or more items by moving the image capture device around from different angles or different distances or both as one or more additional images for additional image processing by image recognition, or (iii) moving the one or more flagged items to different positions and capturing one or more additional images for additional image processing by image recognition.

11. The non-transitory computer-readable recording medium of claim 10, wherein the prescreening operation further comprises:
receiving category information of the one or more items for the user, wherein the list includes different items for different categories; and
analyzing the image processed by image recognition to determine whether any of the one or more items are listed on the list based on the category information.

12. The non-transitory computer-readable recording medium of claim 10, wherein one or more items in the image are listed on the list as one or more flagged items, the prescreening operation further comprising:
if the user takes no action with regard to the one or more flagged items in response to the prompting, terminating image processing of the one or more items; and
in response to the action taken by the user,
performing the additional image processing of the one or more additional images by image recognition;
analyzing the one or more additional images processed by image recognition to determine whether any of the one or more items are listed on the list;
if none of the one or more items in the one or more additional images is listed on the list, informing the user that none of the one or more items in the image is listed on the list; and
if any of the one or more items in the one or more additional images is listed on the list, identifying each item in the one or more additional images which is listed on the list to the user.

13. The non-transitory computer-readable recording medium of claim 10,
wherein performing the additional image processing of the one or more additional images by image recognition comprises at least one of (i) performing object recognition, (ii) performing 2D image to 3D model processing, (iii) performing size analysis, or (iv) performing occluded image processing, of the one or more additional images.

14. The non-transitory computer-readable recording medium of claim 13, wherein one or more items in the one or more additional images are listed on the list as one or more updated flagged items, the prescreening operation further comprising:
prompting the user to take action with regard to the one or more updated flagged items, the action for the one or more updated flagged items including at least one of (i) taking one or more additional still photographs of the one or more items from different angles or different distances or both as one or more updated additional images for additional image processing by image recognition, (ii) taking a video of the one or more items by moving the image capture device around from different angles or different distances or both as one or more updated additional images for additional image processing by image recognition, or (iii) moving the one or more updated flagged items to different positions and capturing one or more updated additional images for additional image processing by image recognition; and
calculating an updated confidence score representing a level of confidence by statistically analyzing data generated by analyzing the one or more additional images processed by image recognition;
wherein the user is prompted to take action with regard to the one or more updated flagged items based on the updated confidence score.

15. The non-transitory computer-readable recording medium of claim 10, wherein the prescreening operation further comprises:
determining whether any of the one or more items are listed on the list by a combination of analyzing the image and analyzing the one or more additional images processed by image recognition.

16. The prescreening system of claim 7, wherein the processor is configured to:
calculate a confidence score representing a level of confidence by statistically analyzing data generated by analyzing the image processed by image recognition; and
prompt the user to take action with regard to the one or more flagged items based on the confidence score, the action for the one or more flagged items including at least one of (i) taking one or more additional still photographs of the one or more items from different angles or different distances or both as one or more additional images for additional image processing by image recognition, (ii) taking a video of the one or more items by moving the image capture device around from different angles or different distances or both as one or more additional images for additional image processing by image recognition, or (iii) moving the one or more flagged items to different positions and capturing one or more additional images for additional image processing by image recognition.

17. The prescreening system of claim 16, wherein one or more items in the image are listed on the list as one or more flagged items, wherein the processor is configured to:
if the user takes no action with regard to the one or more flagged items in response to the prompting, terminate image processing of the one or more items; and
in response to the action taken by the user,
perform the additional image processing of the one or more additional images by image recognition;
analyze the one or more additional images processed by image recognition to determine whether any of the one or more items are listed on the list;
if none of the one or more items in the one or more additional images is listed on the list, inform the user that none of the one or more items in the image is listed on the list; and
if any of the one or more items in the one or more additional images is listed on the list, identify each item in the one or more additional images which is listed on the list to the user.

18. The prescreening system of claim 16,
wherein the processor is configured to calculate the confidence score by using weighting factors corresponding to image processes of (i) the object recognition module, the 2D image to 3D model processing module, the size analysis module, and the occluded image processing module, of the image of the one or more items, the weighting factors assigning different weights to contributions of the image processes to the confidence score.

19. The prescreening system of claim 16,
wherein performing the additional image processing of the one or more additional images by image recognition comprises at least one of (i) performing object recognition by the object recognition module, (ii) performing 2D image to 3D model processing by the 2D image to 3D model processing module, (iii) performing size analysis by the size analysis module, or (iv) performing occluded image processing by the occluded image processing module, of the one or more additional images.

20. The prescreening system of claim 19, wherein one or more items in the one or more additional images are listed on the list as one or more updated flagged items, wherein the processor is configured to:
prompt the user to take action with regard to the one or more updated flagged items, the action for the one or more updated flagged items including at least one of (i) taking one or more additional still photographs of the one or more items from different angles or different distances or both as one or more updated additional images for additional image processing by image recognition, (ii) taking a video of the one or more items by moving the image capture device around from different angles or different distances or both as one or more updated additional images for additional image processing by image recognition, or (iii) moving the one or more updated flagged items to different positions and capturing one or more updated additional images for additional image processing by image recognition; and
calculate an updated confidence score representing a level of confidence by statistically analyzing data generated by analyzing the one or more additional images processed by image recognition;
wherein the user is prompted to take action with regard to the one or more updated flagged items based on the updated confidence score.

21. The prescreening system of claim 16, wherein the processor is configured to:
   determine whether any of the one or more items are listed on the list by a combination of analyzing the image and analyzing the one or more additional images processed by image recognition.

22. The prescreening system of claim 7, wherein the processor is configured to:
   receive category information of the one or more items for the user, wherein the list includes different items for different categories; and
   analyze the image processed by image recognition to determine whether any of the one or more items are listed on the list based on the category information.

23. The prescreening system of claim 9, wherein the processor is configured to:
   calculate a confidence score representing a level of confidence by statistically analyzing data generated by analyzing the image processed by image recognition; and
   prompt the user to take action with regard to the one or more flagged items based on the confidence score, the action for the one or more flagged items including at least one of (i) taking one or more additional still photographs of the one or more items from different angles or different distances or both as one or more additional images for additional image processing by image recognition, (ii) taking a video of the one or more items by moving the image capture device around from different angles or different distances or both as one or more additional images for additional image processing by image recognition, or (iii) moving the one or more flagged items to different positions and capturing one or more additional images for additional image processing by image recognition.

24. The prescreening system of claim 23, wherein the processor is configured to calculate the confidence score by using weighting factors corresponding to image processes of the object recognition module, the 2D image to 3D model processing module, the size analysis module, and the occluded image processing module, of the image of the one or more items, the weighting factors assigning different weights to contributions of the image processes to the confidence score.

25. The prescreening system of claim 23, wherein performing the additional image processing of the one or more additional images by image recognition comprises at least one of (i) performing object recognition by the object recognition module, (ii) performing 2D image to 3D model processing by the 2D image to 3D model processing module, (iii) performing size analysis by the size analysis module, or (iv) performing occluded image processing by the occluded image processing module, of the one or more additional images.

26. The prescreening system of claim 23, wherein the processor is configured to:
   determine whether any of the one or more items are listed on the checklist by a combination of analyzing the image and analyzing the one or more additional images processed by image recognition.

\* \* \* \* \*